(12) United States Patent
Tanaka

(10) Patent No.: US 9,353,510 B2
(45) Date of Patent: May 31, 2016

(54) VAPOR PRESSURE LOWERING AGENT FOR SEAL WATER IN DRAIN TRAP, METHOD FOR PREVENTING SEAL BREAKAGE IN DRAIN TRAP BY USING VAPOR PRESSURE LOWERING AGENT FOR SEAL WATER IN DRAIN TRAP, ANTIFREEZING AGENT FOR WATER, AND METHOD FOR PREVENTING SEAL BREAKAGE IN DRAIN TRAP BY USING ANTIFREEZING AGENT FOR WATER

(71) Applicant: Tetsuya Shibano, Osaka (JP)

(72) Inventor: Sei Tanaka, Osaka (JP)

(73) Assignee: Tetsuya Shibano, Osaka (JP)

( * ) Notice: Subject to any disclaimer, the term of this patent is extended or adjusted under 35 U.S.C. 154(b) by 253 days.

(21) Appl. No.: 14/346,598

(22) PCT Filed: Sep. 21, 2012

(86) PCT No.: PCT/JP2012/074274
§ 371 (c)(1),
(2) Date: Mar. 21, 2014

(87) PCT Pub. No.: WO2013/042779
PCT Pub. Date: Mar. 28, 2013

(65) Prior Publication Data
US 2014/0216561 A1    Aug. 7, 2014

(30) Foreign Application Priority Data

Sep. 22, 2011  (JP) ................... 2011-206982

(51) Int. Cl.
*C09K 15/04*    (2006.01)
*E03C 1/28*    (2006.01)
(Continued)

(52) U.S. Cl.
CPC . *E03C 1/281* (2013.01); *C09K 3/18* (2013.01); *E03C 1/294* (2013.01); *C09K 15/04* (2013.01); *Y10T 137/0391* (2015.04)

(58) Field of Classification Search
CPC ............................. C09K 15/04; E03C 1/281

USPC ............................................... 252/73; 137/13
See application file for complete search history.

(56) References Cited

U.S. PATENT DOCUMENTS 4,564,460 A  *  1/1986  Dorer, Jr. ................. C10L 1/14
                                                            252/73
7,270,768 B2      9/2007  Sapienza et al.
(Continued)

FOREIGN PATENT DOCUMENTS

CN    101151344 A    3/2008
CN    102137975 A    7/2011
(Continued)

OTHER PUBLICATIONS

Office Action issued in Korean Application No. 10-2014-7006087, dated Jun. 8, 2015.
(Continued)

*Primary Examiner* — John K Fristoe, Jr.
*Assistant Examiner* — Christopher Ballman
(74) *Attorney, Agent, or Firm* — Michael Best & Friedrich LLP

(57) ABSTRACT

A water vapor pressure lowering agent which is safe, is easily mixed with seal water, and is usable even in a cold region; the water vapor pressure lowering agent includes urea, a surfactant, purified glycerol, and water or alkaline reducing water, and the purified glycerol is obtained by purifying waste glycerol containing ethanol, an oil or fat, water, and a carbide by distillation. In a method for preventing seal breakage in a drain trap (T) by using the water vapor pressure lowering agent, the vapor pressure lowering agent is introduced such that a liquid level is equal to or higher than a seal water maintenance lower limit in a seal water portion of the drain trap (T).

14 Claims, 12 Drawing Sheets

(51) Int. Cl.
*E03C 1/294* (2006.01)
*C09K 3/18* (2006.01)

(56) References Cited

U.S. PATENT DOCUMENTS

| | | | |
|---|---|---|---|
| 2005/0247907 A1* | 11/2005 | Sapienza | C07C 31/225 252/70 |
| 2007/0227398 A1 | 10/2007 | Koefod | |
| 2009/0085003 A1 | 4/2009 | Tochigi et al. | |
| 2011/0162720 A1 | 7/2011 | Ueno | |
| 2012/0104305 A1* | 5/2012 | Sapienza | C07C 31/225 252/2 |

FOREIGN PATENT DOCUMENTS

| | | |
|---|---|---|
| JP | 2003-261414 A | 9/2003 |
| JP | 2007-161807 A | 6/2007 |
| JP | 2008-539308 A | 11/2008 |
| JP | 2009-120689 A | 6/2009 |
| JP | 2009-531525 A | 9/2009 |
| JP | 4658218 B1 | 3/2011 |
| JP | 2011-106233 A | 6/2011 |
| JP | 2011-252346 A | 12/2011 |
| JP | 2012-082572 A | 4/2012 |
| KR | 100 259 392 B1 | 6/2000 |
| WO | WO-2006/116254 A1 | 11/2006 |
| WO | WO-2007/117386 A1 | 10/2007 |

OTHER PUBLICATIONS

International Search Report issued in Application No. PCT/JP2012/074274, mailed Nov. 27, 2012.
Written Opinion of Internatilnal Search Authority of PCT/JP2012/074274, mailed Nov. 27, 2012.
Web page, "Trap keeper. EC-101", http://www.lifestyle-service.net/torapkeep/trapkeep.htm, 8 sheets, A.I.S. Limited Company.
Office Action issued in Chinese Application No. 201280045197.X. dated Sep. 26, 2014.
Extended Search Report issued in European Application No. 12833758.1, dated Oct. 12, 2015.

* cited by examiner

VAPOR PRESSURE LOWERING AGENT FOR SEAL WATER IN DRAIN TRAP, METHOD FOR PREVENTING SEAL BREAKAGE IN DRAIN TRAP BY USING VAPOR PRESSURE LOWERING AGENT FOR SEAL WATER IN DRAIN TRAP, ANTIFREEZING AGENT FOR WATER, AND METHOD FOR PREVENTING SEAL BREAKAGE IN DRAIN TRAP BY USING ANTIFREEZING AGENT FOR WATER

TECHNICAL FIELD

The present invention relates to a vapor pressure lowering agent for seal water in a drain trap, a method for preventing seal breakage in a drain trap by using the vapor pressure lowering agent for the seal water in the drain trap, an antifreezing agent for water, and a method for preventing seal breakage in a drain trap by using the antifreezing agent for water.

BACKGROUND ART

Hitherto, a drain trap for storing water therein is provided at a drain pipe at a washstand, a sink, or the like in order to prevent an offensive odor from entering a room from the sewerage side and to prevent creatures such as insects from entering the room from the sewerage side. However, when a washstand, a sink, or the like is not used for a long period of time due to a reason such as absence from a house, no renter for an apartment, or the like, there is a concern that seal water vaporizes (disappears) and an offensive odor enters a room from the sewerage side or creatures such as insects enter the room from the sewerage side. Thus, in order to prevent vaporization of the seal water, an oil is added to the seal water to cover the surface of the water (e.g., see Non-Patent Literature 1).

However, the specific gravity of the oil is lower than that of water, and thus there is a drawback that when the oil is added, the oil has difficulty in moving in the seal water from the drain outlet side to the sewerage side. In addition, there is also a problem that water in a drain trap is frozen in a cold region, and thus, hitherto, ethylene glycol is used for a cold region in some cases.

CITATION LIST

Non-Patent Documents

Non-Patent Literature 1: Homepage address of "Trap Keeper EC-101", http://www.lifestyle-service.net/torap-keep/torapkeep.htm

SUMMARY OF THE INVENTION

Problems to be Solved by the Invention

When the above oil is added, the oil has difficulty in moving in the seal water from the drain outlet side to the sewerage side. In addition, the above ethylene glycol is a poisonous substance for which a fatal amount is set, and if the ethylene glycol leaks to the natural world, the dangerousness is high. In addition, there is a problem that as a refrigerant (water) for central heating, water is frozen in a cold region.

Therefore, an object of the present invention is to provide a vapor pressure lowering agent, for seal water in a drain trap, which is safe, is easily mixed with seal water, and is usable even in a cold region.

Solution to the Problems

A first characteristic configuration of a vapor pressure lowering agent for seal water in a drain trap of the present invention is that the vapor pressure lowering agent for the seal water in the drain trap includes urea, a surfactant, purified glycerol, and water or alkaline reducing water, the purified glycerol is obtained by purifying waste glycerol containing ethanol, an oil or fat, water, and a carbide by distillation, and the urea is contained in an amount of 10 to 15 wt %.

According to the first characteristic configuration of the present invention, each of the urea and the purified glycerol is dissolved well in water to reduce the freezing point of the water and also to be able to increase the boiling point of the water. In addition, due to the synergistic effect of them, it is possible to further increase the boiling point of the water to lower the vapor pressure of the water.

In addition, the surfactant decreases the surface tension, and thus, for example, a capillary phenomenon due to filth or garbage attached to an inner peripheral wall of a drain pipe at a drain portion is less likely to occur. Therefore, suction of seal water in a drain trap is suppressed, and it is possible to reduce the quantity of vaporization of the seal water.

In addition, for lowering the vapor pressure, in the case where no water is present mainly with respect to the urea and the purified glycerol, the urea is solid crystal at ordinary temperature, and it is difficult to introduce the purified glycerol to seal water since the purified glycerol has high viscosity. Even when the purified glycerol is introduced, the purified glycerol is less likely to be easily mixed with the seal water. Thus, it is difficult to lower the vapor pressure of the seal water. On the other hand, since the water or the alkaline reducing water is included, the agent is easily mixed with the seal water, and the vapor pressure of the seal water is rapidly lowered.

Moreover, since the purified glycerol is obtained by purifying waste glycerol containing ethanol, an oil or fat, water, and a carbide by distillation, it is possible to use, at low cost, waste glycerol which is generally problematic as special industrial waste in disposal thereof, thereby contributing to reduction and effective use of waste.

Since the urea, the surfactant, the purified glycerol, and the water or the alkaline reducing water are included, freezing point reduction is also exerted in addition to the vapor pressure lowering effect, and thus an antifreezing effect on the seal water can also be expected.

In a second characteristic configuration of the present invention, an amount of the surfactant is 0.1 to 5 wt %, an amount of the purified glycerol is 10 to 80 wt %, and the rest of the agent is mainly the water or the alkaline reducing water.

According to the second characteristic configuration of the present invention, when the amount of the surfactant is less than 0.1 wt % or greater than 5 wt %, the surfactant is less likely to be able to exert its effect.

When the amount of the purified glycerol is less than the lower limit, the vapor pressure is not sufficiently lowered. When the amount of the purified glycerol is greater than the upper limit, the viscosity of the agent is increased and introduction becomes difficult. In addition, the ratio of the water or the alkaline reducing water which is the rest is decreased, and handling becomes difficult.

Therefore, when the amount of the surfactant is 0.1 to 5 wt %, the amount of the purified glycerol is 10 to 80 wt %, and the rest of the agent is mainly the water or the alkaline reducing water, it is possible to effectively exert a vapor pressure lowering effect.

In a third characteristic configuration of the present invention, the agent includes 20 to 80 wt % of the water or the alkaline reducing water.

According to the third characteristic configuration of the present invention, when the amount of the water or the alkaline reducing water is less than 20 wt %, the viscosity of the vapor pressure lowering agent is increased and introduction to the seal water becomes difficult. When the amount of the water or the alkaline reducing water is greater than 80 wt %, the ratio of the urea and the purified glycerol is decreased and the vapor pressure lowering effect is reduced.

In a fourth characteristic configuration of the present invention, pH of the entire agent is 9.0 to 10.0

According to the fourth characteristic configuration of the present invention, when pH of the entire agent is less than 9.0, microorganism growth easily occurs within a drained water in the seal water to which the agent is introduced. When pH of the entire agent is greater than 10.0, microorganism forming a microbial film within a pipe die, and the microbial film peels off and falls off. The peeled microbial film floats up onto the surface of water to deteriorate the appearance, and there is a concern that treatment in a septic tank at the downstream side is deteriorated.

Therefore, when pH is 9.0 to 10.0, it is possible to keep a water state in the seal water favorable.

In a fifth characteristic configuration of the present invention, the purified glycerol is obtained by esterifying and purifying a plant-derived edible waste oil.

According to the fifth characteristic configuration of the present invention, the plant-derived edible waste oil has an iodine value of equal to or greater than 120, a low freezing point, and a high boiling point, and the vapor pressure lowering effect by the purified glycerol is also effective.

A sixth characteristic configuration of the present invention is a method for preventing seal breakage in a drain trap by using the vapor pressure lowering agent for the seal water in the drain trap of the first to fifth inventions, the method including introducing the vapor pressure lowering agent such that a liquid level is equal to or higher than a seal water maintenance lower limit in a seal water portion of the drain trap.

According to the sixth characteristic configuration of the present invention, since the vapor pressure lowering agent for the seal water in the drain trap of the present invention is introduced such that the liquid level is equal to or higher than the seal water maintenance lower limit in the seal water portion of the drain trap, even in the case of absence from a house for a long period of time, vaporization of water is suppressed to maintain the liquid level at a level equal to or higher than the lower limit for seal water, and it is possible to prevent an offensive odor from entering a room from the sewerage side.

In a seventh characteristic configuration of the present invention, a mixing ratio of the purified glycerol in the vapor pressure lowering agent is set such that even when a vaporization component in the vapor pressure lowering agent vaporizes, the purified glycerol is ensured in such a remaining amount as to be equal to or higher than the seal water maintenance lower limit in the seal water portion of the drain trap, and the vapor pressure lowering agent is introduced to the seal water portion of the drain trap.

According to the seventh characteristic configuration of the present invention, even when the vaporization component such as water in the seal water vaporizes after the vapor pressure lowering agent of the present invention is introduced to the seal water, since the purified glycerol is ensured in such a remaining amount as to be equal to or higher than the seal water maintenance lower limit in the seal water portion, it is possible to prevent entry of an offensive odor from the sewerage side to the indoor side and it is possible to keep the indoor environment favorable.

A water antifreezing agent according to an eighth characteristic configuration of the present invention includes urea, a surfactant, purified glycerol, and water or alkaline reducing water, the purified glycerol is obtained by purifying waste glycerol containing ethanol, an oil or fat, water, and a carbide by distillation, and the urea is contained in an amount of 10 to 15 wt %.

According to the eighth characteristic configuration of the present invention, each of the urea and the purified glycerol is dissolved well in water to reduce the freezing point of the water and also to be able to increase the boiling point of the water. In addition, due to the synergistic effect of them, it is possible to further increase the boiling point of the water to lower the vapor pressure of the water.

In addition, the surfactant decreases the surface tension, and thus, for example, a capillary phenomenon due to filth or garbage attached to an inner peripheral wall of a drain pipe at a drain portion is less likely to occur. Therefore, suction of seal water in a drain trap is suppressed, and it is possible to reduce the quantity of vaporization of the seal water.

In addition, for lowering the vapor pressure, in the case where no water is present mainly with respect to the urea and the purified glycerol, the urea is solid crystal at ordinary temperature, and it is difficult to introduce the purified glycerol to seal water since the purified glycerol has high viscosity. Even when the purified glycerol is introduced, the purified glycerol is less likely to be easily mixed with the seal water. Thus, it is difficult to lower the vapor pressure of the seal water. On the other hand, since the water or the alkaline reducing water is included, the agent is easily mixed with the seal water, and the vapor pressure of the seal water is rapidly lowered.

Moreover, since the purified glycerol is obtained by purifying waste glycerol containing ethanol, an oil or fat, water, and a carbide by distillation, it is possible to use, at low cost, waste glycerol which is generally problematic as special industrial waste in disposal thereof, thereby contributing to reduction and effective use of waste.

Therefore, since the urea, the surfactant, the purified glycerol, and the water or the alkaline reducing water are included, while the vapor pressure is lowered to maintain the sealing function in the drain trap for a long period of time, freezing point reduction is also exerted in addition to the vapor pressure lowering effect, thus an antifreezing effect on the seal water can also be expected, and it is also possible to prevent breakage of the drain trap regardless of variation in the air temperature.

In a ninth characteristic configuration of the present invention, an amount of the surfactant is 0.1 to 5 wt %, an amount of the purified glycerol is 10 to 80 wt %, and the rest of the agent is mainly the water or the alkaline reducing water.

According to the ninth characteristic configuration of the present invention, when the amount of the surfactant is less than 0.1 wt % or greater than 5 wt %, the surfactant is less likely to be able to exert its effect.

When the amount of the purified glycerol is less than the lower limit, the vapor pressure is not sufficiently lowered. When the amount of the purified glycerol is greater than the upper limit, the viscosity of the agent is increased and introduction becomes difficult. In addition, the ratio of the water or the alkaline reducing water which is the rest is decreased, and handling becomes difficult.

Therefore, when the amount of the surfactant is 0.1 to 5 wt %, the amount of the purified glycerol is 10 to 80 wt %, and the rest of the agent is mainly the water or the alkaline reducing water, it is possible to exert a vapor pressure lowering effect, thereby preventing breakage of the drain trap due to its freezing while maintaining the sealing function.

In a tenth characteristic configuration of the present invention, the agent includes 20 to 80% of the water or the alkaline reducing water.

According to the tenth characteristic configuration of the present invention, when the amount of the water or the alkaline reducing water is less than 20 wt %, the viscosity of the vapor pressure lowering agent is increased and introduction to the seal water becomes difficult. When the amount of the water or the alkaline reducing water is greater than 80 wt %, the ratio of the urea and the purified glycerol is decreased, and not only the vapor pressure lowering effect but also the freezing point reducing effect are reduced.

In an eleventh characteristic configuration of the present invention, pH of the entire agent is 9.0 to 10.0.

According to the eleventh characteristic configuration of the present invention, when pH of the entire agent is less than 9.0, microorganism growth easily occurs within a drained water in the seal water to which the agent is introduced. When pH of the entire agent is greater than 10.0, microorganism forming a microbial film within a pipe die, and the microbial film peels off and falls off. The peeled microbial film floats up onto the surface of water to deteriorate the appearance, and there is a concern that treatment in a septic tank at the downstream side is deteriorated.

Therefore, when pH is 9.0 to 10.0, it is possible to keep a water state in the seal water favorable.

In a twelfth characteristic configuration of the present invention, the purified glycerol is obtained by esterifying and purifying a plant-derived edible waste oil.

According to the twelfth characteristic configuration of the present invention, the plant-derived edible waste oil has an iodine value of equal to or greater than 120, a low freezing point, and a high boiling point, and the freezing point reducing effect by the purified glycerol is also effective.

A method for preventing seal breakage in a drain trap by introducing the antifreezing agent, according to a thirteenth characteristic configuration of the present invention, includes introducing the antifreezing agent such that a liquid level is equal to or higher than a seal water maintenance lower limit in a seal water portion of the drain trap.

According to the thirteenth characteristic configuration of the present invention, since the antifreezing agent of the present invention is introduced such that the liquid level is equal to or higher than the seal water maintenance lower limit in the seal water portion of the drain trap, even in the case of absence from a house for a long period of time, vaporization of water is suppressed to maintain the liquid level at a level equal to or higher than the lower limit for seal water, and it is possible to prevent an offensive odor from entering a room from the sewerage side.

In a fourteenth characteristic configuration of the present invention, a mixing ratio of the purified glycerol in the antifreezing agent is set such that even when a vaporization component in the antifreezing agent vaporizes, the purified glycerol is ensured in such a remaining amount as to be equal to or higher than the seal water maintenance lower limit in the seal water portion of the drain trap, and the antifreezing agent is introduced to the seal water portion of the drain trap.

According to the fourteenth characteristic configuration of the present invention, even when the vaporization component such as water in the seal water vaporizes after the antifreezing agent of the present invention is introduced to the seal water, since the purified glycerol is ensured in such a remaining amount as to be equal to or higher than the seal water maintenance lower limit in the seal water portion, it is possible to prevent entry of an offensive odor from the sewerage side to the indoor side and it is possible to keep the indoor environment favorable.

Advantageous Effects of the Invention

According to the present invention, when being introduced to a drain trap, the agent is easily mixed with the entirety of seal water. In addition, vaporization is less likely to occur and a sealing effect is ensured over a long period of time. In particular, in a cold region, the vapor pressure is sufficiently lowered, freezing does not occur, and the safety is high. Moreover, as a refrigerant (water) for central heating, it is possible to prevent freezing by lowering the vapor pressure.

DESCRIPTION OF EMBODIMENTS

Figure 1:
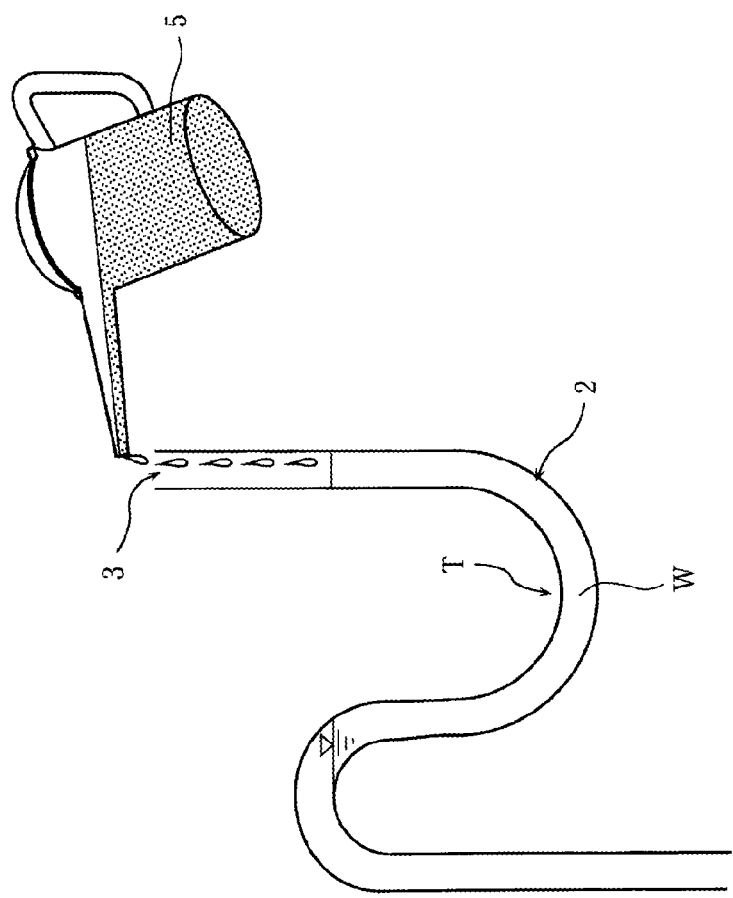
FIG. 1 is a simple explanatory diagram of a usage state of a vapor pressure lowering agent according to the present invention.
Figure 2:
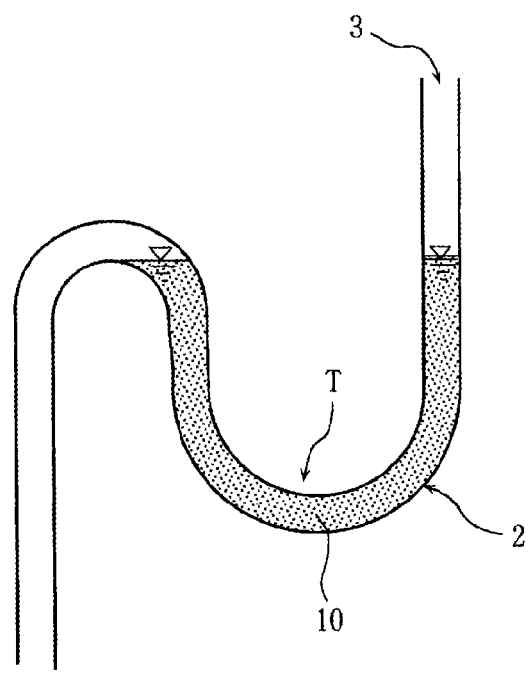
FIG. 2 is a simple explanatory diagram of the usage state of the vapor pressure lowering agent according to the present invention.

In FIGS. 1 and 2, when a water vapor pressure lowering agent 5 according to the present invention is introduced through an upper opening 3 of a drain pipe 2 having a S-shaped drain trap T, the water vapor pressure lowering agent 5 is mixed with seal water W within the S-shaped drain trap T.

As shown in FIG. 1, when the water vapor pressure lowering agent 5 is introduced from the opening side of the drain trap T, the water vapor pressure lowering agent 5 is naturally mixed with the entirety of the seal water W to make a mixed seal water liquid 10 as shown in FIG. 2.

The water vapor pressure lowering agent 5 according to the present invention includes urea, a surfactant, purified glycerol, and water or alkaline reducing water. Specifically, an amount of the urea is 5 to 20 wt %, an amount of the surfactant is 0.1 to 5 wt %, an amount of the purified glycerol is 10 to 80 wt %, and the rest of the agent is a component including mainly the water or the alkaline reducing water.

Desirably, the purified glycerol is obtained (produced) by purifying waste glycerol containing ethanol, an oil or fat, water, and a carbide by distillation.

Waste glycerol is a by-product (black unwanted matter) obtained when a bio-diesel fuel (abbreviated as BDF) is purified by esterifying a plant-derived edible waste oil (The iodine value is equal to or higher than 120 and the boiling point is also high. For example, the iodine value is 124 to 139 in the case of soybean oil.). As compared to the melting point of pure glycerin which is 17.8° C., the melting point of waste glycerol is as low as −8° C. to −7° C., and waste glycerol is more difficult to freeze. Presently, waste glycerol is problematic as special industrial waste in disposal thereof. In other words, it is possible to reutilize (recycle) the unwanted waste by using the above properties, thereby contributing to reduction and effective use of waste.

The amount of the purified glycerol is 10 to 80 wt % but preferably 50 to 75 wt %. When the amount is less than the lower limit, (the vapor pressure does not sufficiently lower) vaporization of water from the mixed seal water liquid 10 shown in FIG. 2 is fast and the mixed seal water liquid 10 easily freezes. Thus, the mixed seal water liquid 10 is not practicable in a cold region. When the amount exceeds the upper limit, a risk of ignition (burning) arises. In addition, when the amount exceeds the upper limit, the viscosity of the agent is increased, and the agent may deposit and stay at a lower portion of the drain trap T. Moreover, the freezing point is lowered and the boiling point is increased by the purified glycerol.

The urea has a weak bactericidal activity, the boiling point thereof is 135° C., and the component ratio thereof is 5 to 20 wt % but preferably 10 to 15 wt %. When the component ratio is less than the lower limit, (the vapor pressure does not sufficiently lower) vaporization of water from the mixed seal water liquid 10 is fast and the mixed seal water liquid 10 easily freezes. Thus, the mixed seal water liquid 10 is not practicable in a cold region. When the component ratio exceeds the upper limit, the purified glycerol and the urea react with each other to cause a solidified matter. In other words, since fats and oils are contained in the waste glycerol and it is impossible to completely remove the fats and oils even when purification is conducted by distillation, the urea and a minute amount of the fats and oils contained in the purified glycerol react with each other and solidify to become a milky color.

In addition, it is possible to reduce the freezing point (to make freezing less likely to occur) by the urea and the purified glycerol, and an effect as an antifreezing agent is obtained.

The amount of the surfactant is 0.1 to 5 wt % but preferably equal to or greater than 0.1 wt % and less than 5 wt % and more preferably 2 to 4 wt %. The surface tension is decreased by the surfactant. When the surface tension is decreased (as compared to water), a capillary phenomenon due to filth or garbage attached to an inner peripheral wall of a drain pipe is less likely to occur, suction of the mixed seal water liquid 10 is suppressed, and it is possible to reduce the quantity of vaporization. When the amount exceeds the numerical range, there is a concern that when the vapor pressure lowering agent 5 is introduced, bubbles are generated and mixing becomes insufficient. When the amount is less than the lower limit, there is a concern that it is difficult to obtain an effect of suppressing a capillary phenomenon.

The surfactant is preferably, for example, an alkaline detergent ("Smart Wash" manufactured by Smart Co., Ltd.).

In addition, the ratio (wt %) of the water or the alkaline reducing water is increased, the vapor pressure rises and the freezing point also rises. The freezing point of the purified glycerol is originally about −120° C., but since water or electrolytic alkaline ionized water is added thereto, the freezing point rises and becomes −40° C. to −25° C. The freezing point is preferably −40° C. to −35° C. and more preferably −40° C. to −38° C.

In addition, when the rest is mainly water (purified water or tap water), the cost for manufacture, facility, and the like is low as compared to the alkaline reducing water, and there is an advantage that it is possible to manufacture the vapor pressure lowering agent 5 at low cost.

When the rest is the alkaline reducing water, it is possible to suppress degradation (oxidation) of the drain pipe 2 as compared to water.

It should be noted that "mainly" in "the rest is mainly water (or alkaline reducing water)" means that where the rest of the liquid excluding the purified glycerol, the urea, and the surfactant is set as 100 wt %, 95 to 100 wt % of the rest is water (or alkaline reducing water). For example, it means that the case where the entirety of the above rest of the liquid is water or (alkaline reducing water), or the above rest of the liquid includes a pigment, a perfume, a bactericidal agent, and the like in an amount of 0.1 to 5 wt % in addition to the water (or the alkaline reducing water).

It should be noted that the alkaline reducing water is water called electrolytic alkaline ionized water or electrolytic alkaline reducing water.

Figure 11:
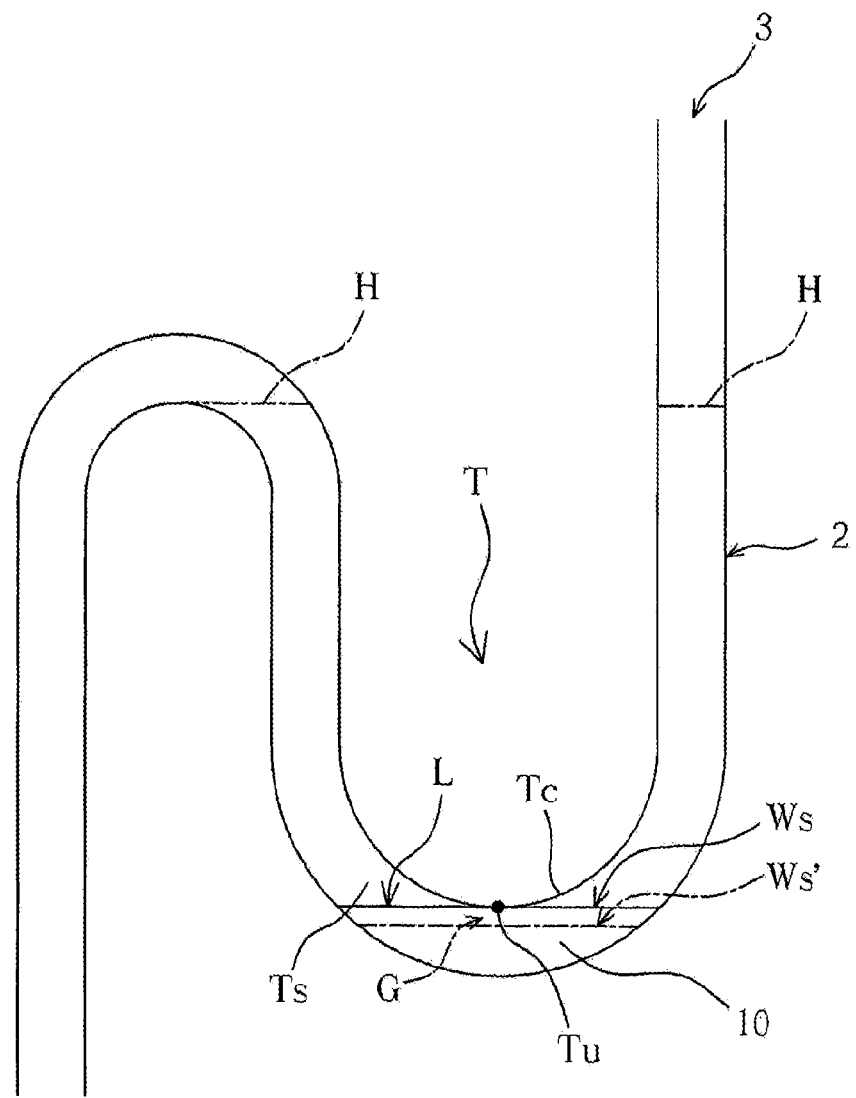
FIG. 11 is a simple explanatory diagram explaining a method for preventing seal breakage in a drain trap according to the present invention.
Figure 12:
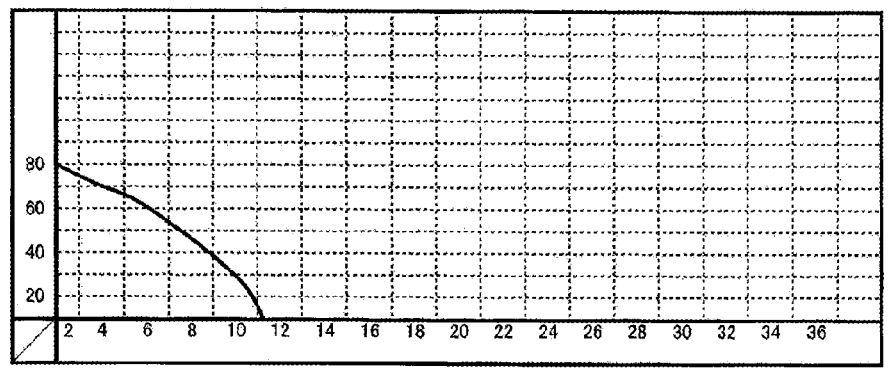
FIG. 12 is a graph showing a vaporization time when water is filled in the drain trap.
Figure 13:
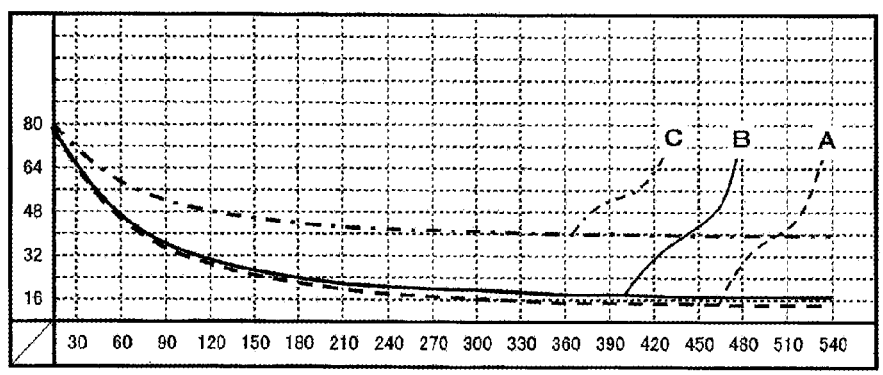
FIG. 13 is a change graph showing a vaporization time when mixture liquids having various water contents are filled in the drain trap.

In addition, it is necessary to include the water or the alkaline reducing water in an amount of 20% to 80%. As shown in FIGS. 11 to 13, when the amount is less than 20 wt %, the viscosity of the vapor pressure lowering agent increases and it is difficult to introduce the vapor pressure lowering agent to the seal water, and when the amount is greater than 80 wt %, the ratio of the urea and the purified glycerol decreases and the vapor pressure lowering effect is reduced. It should be noted that in FIGS. 12 and 13, the horizontal axis indicates day, and the vertical axis indicates volume (cc) of the mixed liquid.

In other words, when water is filled to an overflow level H (80 cc) in a seal water portion of an S-shaped drain trap T shown in FIG. 11, the water vaporizes in about 11 days (FIG. 12). On the other hand, according to a graph shown in FIG. 13, in a curved line A obtained in the case where seal water is replaced with the agent in which an amount of water is 90% as the mixed seal water liquid 10, the volume of the mixed seal water liquid 10 becomes equal to or less than 16 cc at about 360 days and later due to a reduction in the amount of a vaporization component, the level of the mixed seal water liquid 10 becomes equal to or less than a lower limit level L equivalent to a water volume of 17 cc which is a seal water maintenance lower limit, water seal is broken, and an offensive odor from the sewerage side is released into a room.

On the other hand, in a curved line B obtained in the case of being replaced with the agent in which an amount of water is 80% as the mixed seal water liquid 10, the volume of the mixed seal water liquid 10 becomes constant over 17 cc at about 360 days and later due to a reduction in the amount of the vaporization component, and the seal water is maintained. In a curved line C obtained in the case of being replaced with the agent in which an amount of water is 75%, the volume of the mixed seal water liquid 10 becomes 40 cc and constant at about 360 days and later due to a reduction in the amount of the vaporization component.

Therefore, regarding the ratio of water in the agent, 80% is the maximum.

In addition, the pH value of the vapor pressure lowering agent 5 is 9.0 to 10.0 and more preferably 9.5 to 10.0. When the vapor pressure lowering agent 5 is alkalified, an effect of suppressing proliferation of saprophytic bacteria is exerted. It should be noted that in consideration of an environment for microorganisms in a septic tank, the pH value may be adjusted by a pH adjustor or the like.

In addition, the specific gravity of the vapor pressure lowering agent 5 is 1.00 to 1.10, preferably 1.01 to 1.09, and more preferably 1.07 to 1.09. In other words, when the specific gravity is made slightly heavier (greater) as compared to water, the vapor pressure lowering agent 5 is prevented from staying in a large amount at an upper portion of the seal water W like a supernatant, and is well mixed with the seal water W near the sewerage side.

Moreover, the boiling point of the vapor pressure lowering agent 5 in atmospheric pressure is 120° C. to 130° C. and more preferably 125° C. to 130° C. In addition, the vapor pressure lowering agent 5 has no burning point and no ignition point and is highly safe.

EXAMPLES

A vapor pressure lowering agent in Table 1 below was produced.

TABLE 1

| Component | Purified glycerol: 60 wt % |
| --- | --- |
| | Urea: 10 wt % |
| | Surfactant: 3 wt % |
| | Rest: alkaline reducing water |
| Liquid properties | Alkali, pH 10.0 |
| Boiling point | +125° C. |
| Freezing point | −38° C. |
| Specific gravity | 1.08 |

Figure 3:
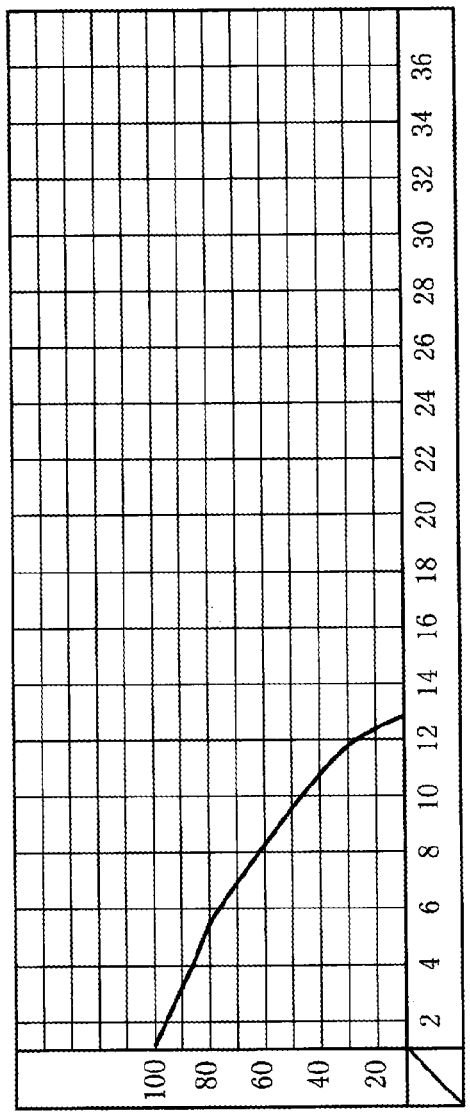
FIG. 3 is a graph showing an experiment result of vaporizability of water 100%.
Figure 4:
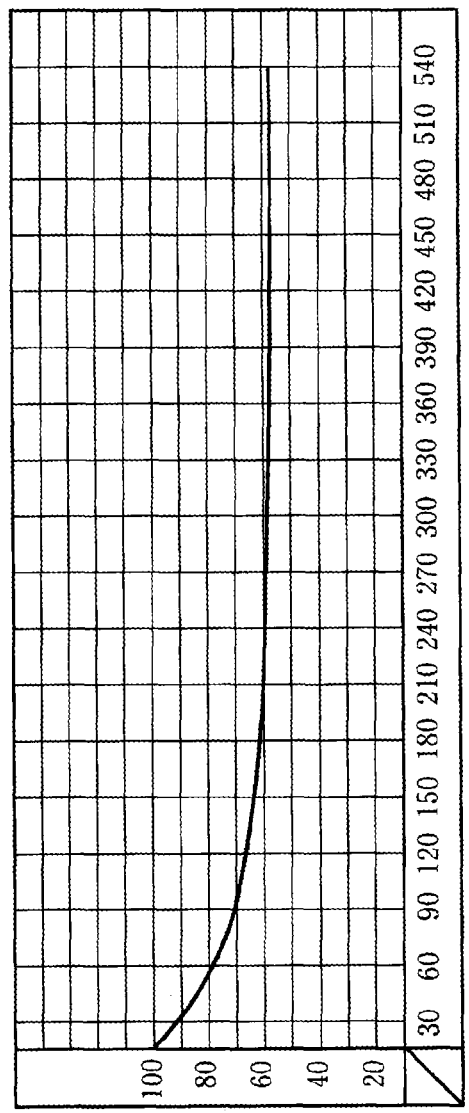
FIG. 4 is a graph showing an experiment result of vaporizability of a mixture of 50 cc of water and 50 cc of a vapor pressure lowering agent of an example (product) of the present invention.

A result of an experiment for 100 cc of a mixed seal water liquid 10 obtained by mixing 50 cc of the agent of the example in the above Table 1 (example product) (hereinafter, may be referred to the present agent) and 50 cc of water (as a substitute for the seal water W provided previously in the drain trap T) (the case of a mixed seal water liquid 10 in which the concentration of the present agent is 50%) is shown in a graph of FIG. 4. The horizontal axis indicates day, and the vertical axis indicates volume (cc). For comparison with this, FIG. 3 shows the case where 100 cc of water 100% was used as the seal water W (the case where the concentration of the present agent is 0%). In either case, the room temperature is 27° C.

As shown in FIG. 3, only with water, the water vaporizes and disappears in 12.5 to 13 days. On the other hand, in the example (experimental example) shown in FIG. 4, 58 cc remains even at 540 days, and it is recognized that it suffices to refill with about 40 to 50 cc of water once in 10 months.

Figure 5:
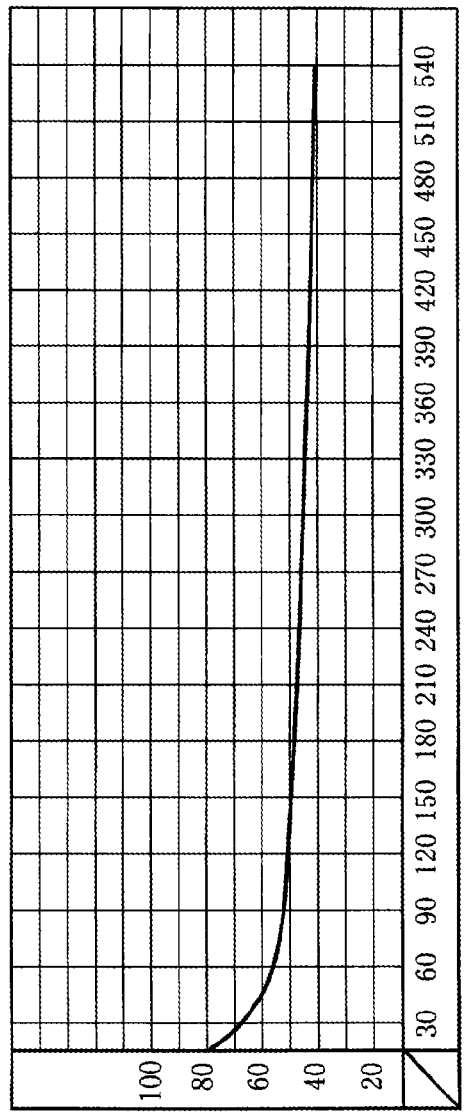
FIG. 5 is a graph showing an experiment result of vaporizability of a mixture of 50 cc of water and 30 cc of the vapor pressure lowering agent of the example (product) of the present invention.

In addition, FIG. 5 is an experiment result obtained when 80 cc of a mixed seal water liquid 10 obtained by mixing 30 cc of the present agent and 50 cc of water (in which the concentration of the present agent is 38%) was filled in the S-shaped drain trap T shown in FIGS. 1 and 2. The horizontal axis indicates day, and the vertical axis indicates volume (cc). As shown in FIG. 5, 40 cc remains even at 540 days, and it is recognized that it suffices to refill the drain trap T with about 40 to 50 cc of water once in 10 months.

Figure 6:
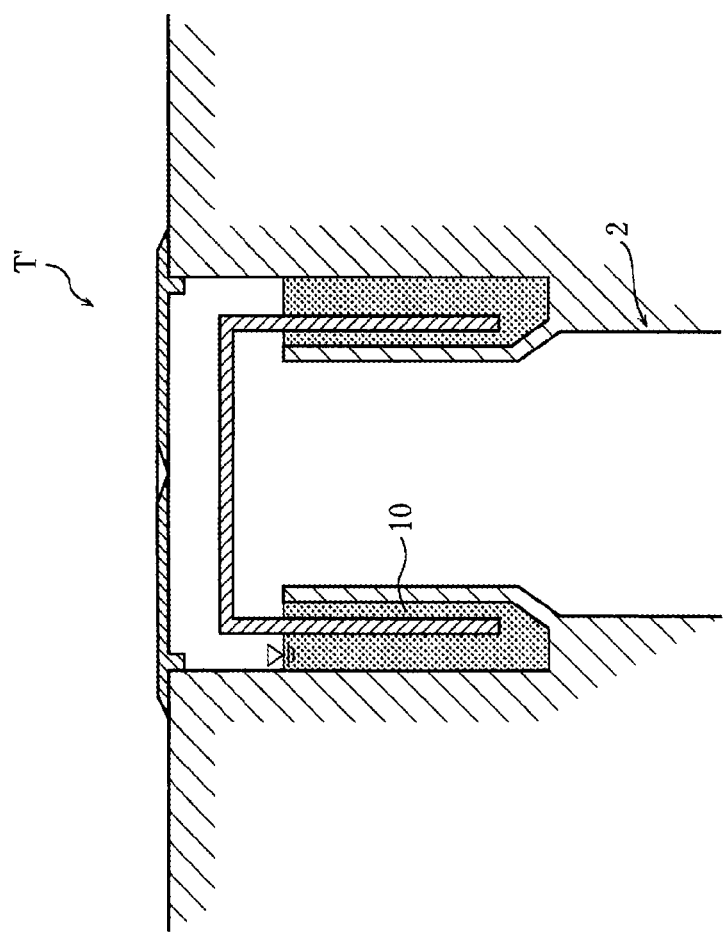
FIG. 6 is a simple explanatory diagram of another usage state of the vapor pressure lowering agent according to the present invention.
Figure 7:
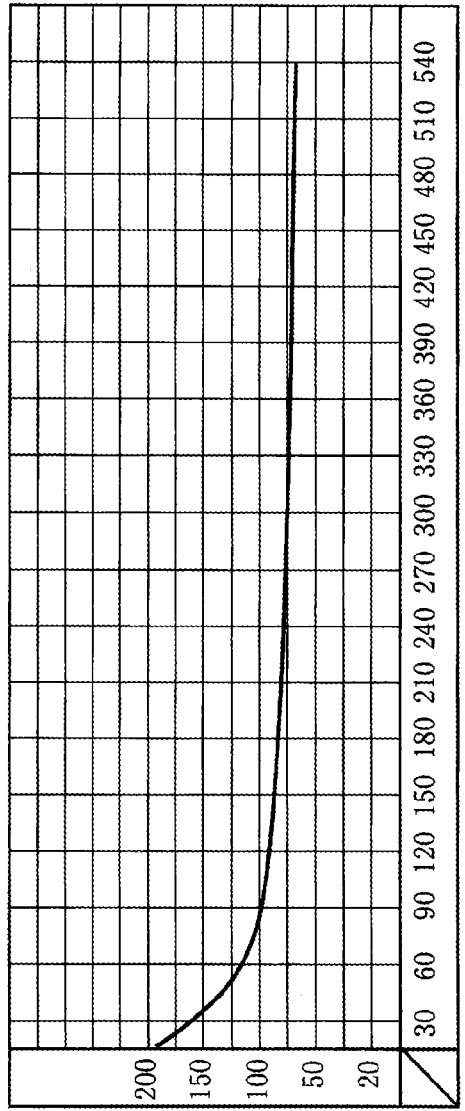
FIG. 7 is a graph showing an experiment result of vaporizability of a mixture of 170 cc of water and 30 cc of the vapor pressure lowering agent of the example (product) of the present invention.
Figure 8:
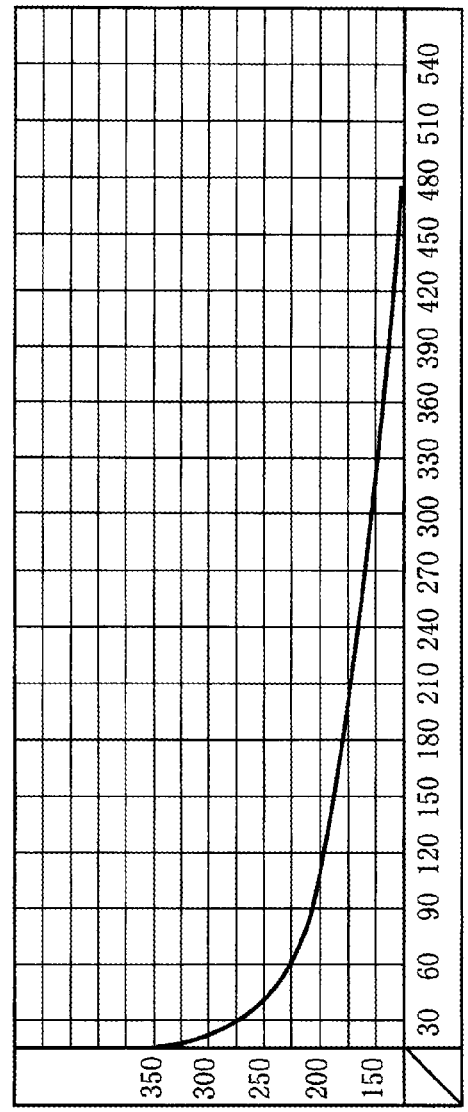
FIG. 8 is a graph showing an experiment result of vaporizability of a mixture of 320 cc of water and 30 cc of the vapor pressure lowering agent of the example (product) of the present invention.

Moreover, experiment results in the case of being used in a bell-shaped drain trap T' provided at a sink or a drain outlet as shown in FIG. 6 are shown in FIGS. 7 and 8.

FIG. 7 is an experiment result obtained when 200 cc of a mixed seal water liquid 10 obtained by mixing 30 cc of the present agent and 170 cc of water (in which the concentration of the present agent is 15%) was filled in a bell-shaped drain trap T' having a maximum filling quantity of 200 cc.

FIG. 8 is an experiment result obtained when 350 cc of a mixed seal water liquid 10 obtained by mixing 30 cc of the present agent and 320 cc of water (in which the concentration of the present agent is 8.5%) was filled in a bell-shaped drain trap T' having a maximum filling quantity of 350 cc. In FIGS. 7 and 8, the horizontal axis indicates day, and the vertical axis indicates volume (cc) of the mixed seal water liquid.

As is obvious in FIG. 7, about 75 cc remains at 300 days to 330 days (about 10 months), and it is recognized that it suffices to refill with about 125 cc of water once in 10 months.

In addition, as is obvious in FIG. 8, about 150 cc remains at 300 days to 330 days (about 10 months), and it is recognized that it suffices to refill with about 200 cc of water once in 10 months.

As described above, regarding the effect of suppressing vaporization, the present invention exhibits an excellent effect. It should be noted that a slight difference in vaporizability occurs depending on the season or the shape or size of the drain trap T or T'.

In addition, in actual use (as a vapor pressure lowering method), where an amount of the mixed seal water liquid 10 corresponding to the (seal water) maximum filling quantity of the drain trap T or T' is set as 100%, the vapor pressure lowering agent 5 is desirably introduced to the (previously stored) seal water W as shown in FIG. 1 such that the concentration of the vapor pressure lowering agent 5 is 5 to 90% and preferably 8% to 70%. The reason is as follows. When the amount of the vapor pressure lowering agent 5 is less than the lower limit, the quantity of vaporization is large, and there is a concern that before 10 months after the introduction, the remaining amount becomes less than a (seal water) minimum filling quantity at which the drain trap T or T' exerts a deodorant or insect-protection effect. In addition, when the amount exceeds the upper limit, a vaporization reducing effect is sufficiently obtained, but no great difference from the case where the concentration is the maximum within the above numeric range is produced. Thus, the vapor pressure lowering agent 5 is wasted.

Figure 9:
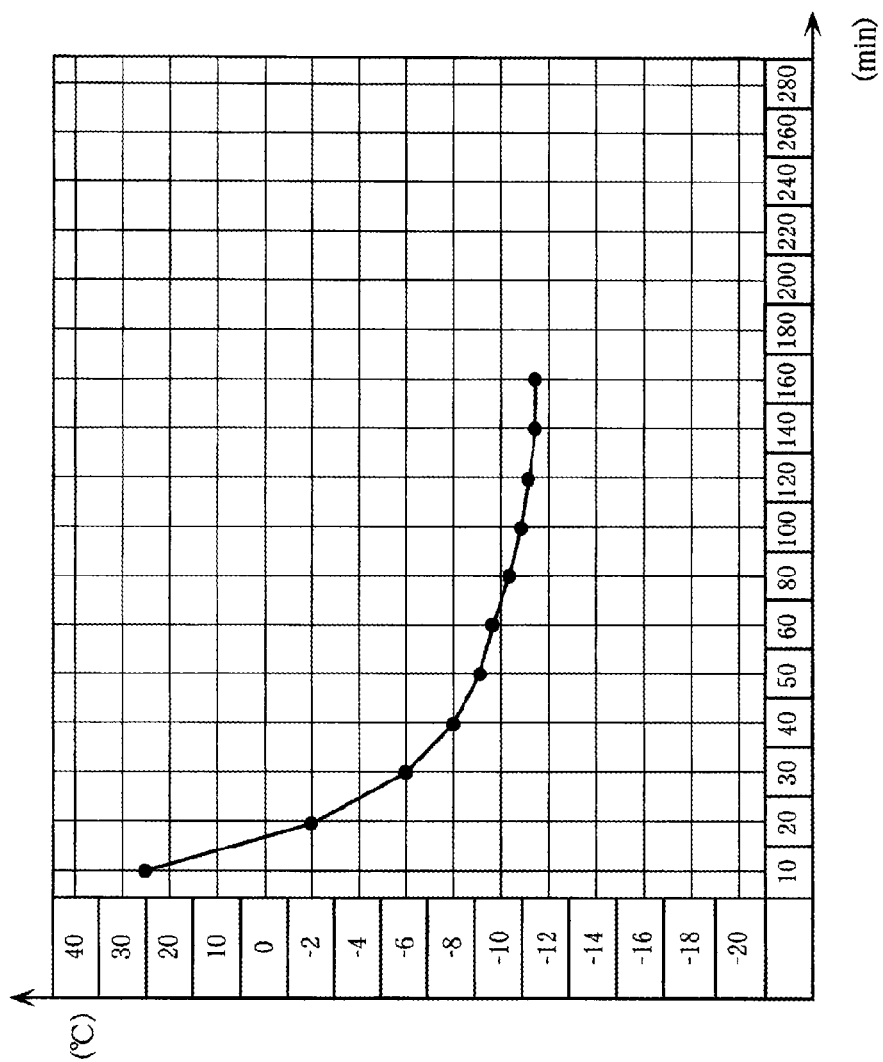
FIG. 9 is a graph showing an experiment result of vaporizability of a mixture of 75 cc of water and 25 cc of the vapor pressure lowering agent of the example (product) of the present invention.
Figure 10:
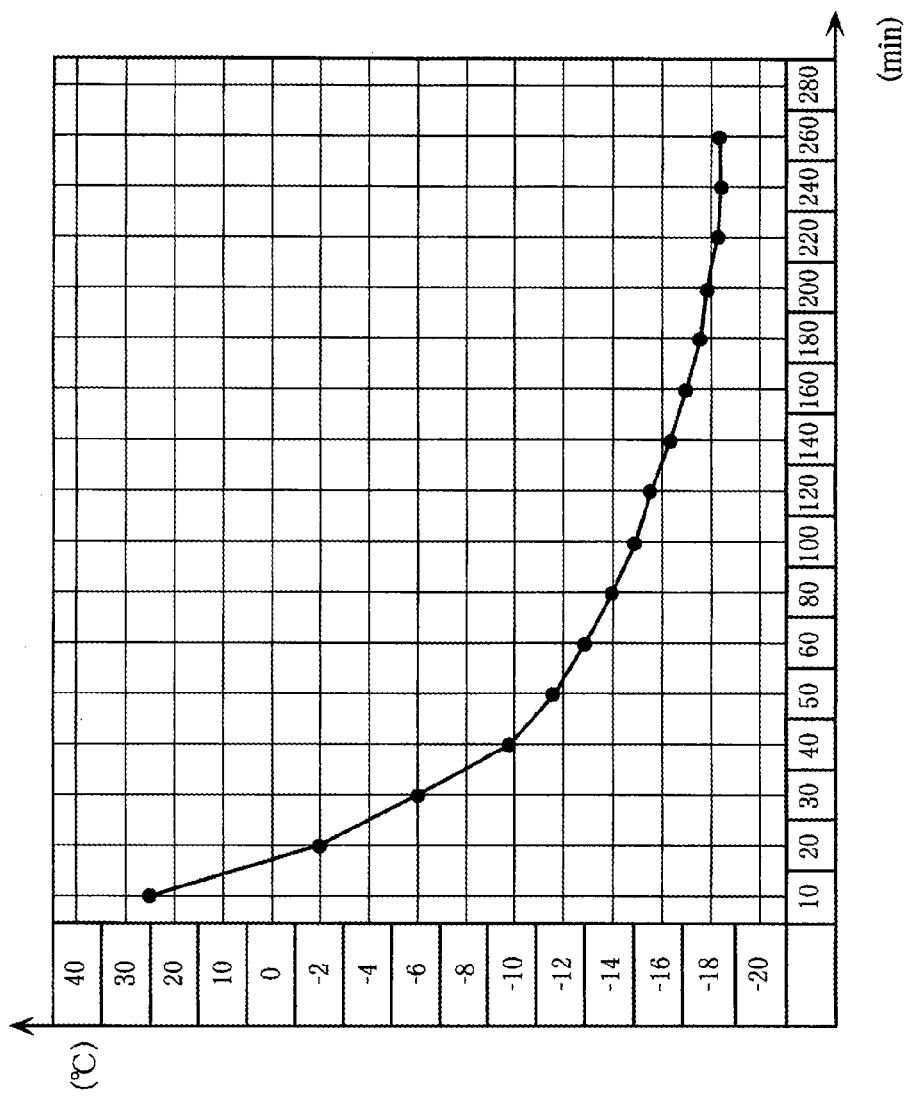
FIG. 10 is a graph showing an experiment result of vaporizability of a mixture of 50 cc of water and 50 cc of the vapor pressure lowering agent of the example (product) of the present invention.

Next, results of experiments for freezability (easiness of freezing) of the present agent are shown in FIGS. 9 and 10.

FIG. 9 is a result of an experiment in which a mixed seal water liquid 10 obtained by mixing 25 cc of the present agent and 75 cc of water (4-times dilution, a concentration of 25%, a liquid temperature of 25° C.) was allowed to stand in a room (a freezing room) at −22° C.

FIG. 10 is a result of an experiment in which a mixed seal water liquid 10 obtained by mixing 50 cc of the present agent and 50 cc of water (2-times dilution, a concentration of 50%, a liquid temperature of 25° C.) was allowed to stand in the room at −22° C. In FIGS. 9 and 10, the horizontal axis indicates time (minute), and the vertical axis indicates temperature (° C.).

As is obvious from FIGS. 9 and 10, it is recognized that the temperature fall becomes gentle from around a time just exceeding 50 minutes after the start. Thereafter, in the example (experimental example) in FIG. 9, it took 160 minutes until solidification (−11.2° C.). In the example experimental example) in FIG. 10, it took 260 minutes until solidification (−18.2° C.).

As described above, an antifreezing effect is obtained such that the higher the concentration of the present agent is, the lower the freezing point is and the longer the time until solidification is (such that the time until freezing is delayed). Thus, it is obvious that the present invention has an excellent antifreezing effect.

It should be noted that a slight difference in freezability occurs depending on the season or the shape or size of the drain trap T or T'.

It should be noted that the vapor pressure lowering agent 5 of the present invention may be introduced and used in a stool within a toilet. In addition, a slight amount of a bactericidal agent may be included as a component. Moreover, the vapor pressure lowering agent 5 may be used in a refrigerant (water) for central heating.

As described above, since the water vapor pressure lowering agent of the present invention includes the urea, the surfactant, the purified glycerol, and the water or the alkaline reducing water, the water vapor pressure lowering agent has a small effect on the natural world, is safe, and does not freeze and can be safely used in a cold region. In addition, with the water vapor pressure lowering agent, water is less likely to vaporize and does not disappear over a long period of time, and, for example, refilling once in 10 months is sufficient. Furthermore, when the water vapor pressure lowering agent is introduced to a trap or the like, the water vapor pressure lowering agent is easily and naturally mixed with the seal water W. Moreover, the present invention is widely usable in a refrigerant (water) for central heating or for prevention of other freezing and is applicable to wide use in a cold region.

In addition, since the amount of the urea is 5 to 20 wt %, the amount of the surfactant is 0.1 to 5 wt %, the amount of the purified glycerol is 10 to 80 wt %, and the rest is mainly the water or the alkaline reducing water, the water vapor pressure lowering agent has a small effect on the natural world, the vapor pressure is sufficiently lowered, and the water vapor pressure lowering agent does not freeze and can be safely used in a cold region.

Furthermore, with the water vapor pressure lowering agent, water is less likely to vaporize and does not disappear over a long period of time, and, for example, refilling once in 10 months is sufficient. Moreover, when the water vapor pressure lowering agent is introduced to the drain trap T or T' or the like, the water vapor pressure lowering agent is easily and naturally mixed with the seal water W. In addition, the water vapor pressure lowering agent has no risk of ignition, does not deposit at the lower portion of the drain trap T or T', and is also less likely to cause a solidified matter. In particular, the water vapor pressure lowering agent is usable even in a cold region where the temperature becomes about −35° C.

In addition, since the purified glycerol is obtained by purifying waste glycerol containing ethanol, an oil or fat, water, and a carbide by distillation, there is an advantage that it is possible to effectively reutilize waste glycerol which is problematic in disposal of a large amount thereof.

Here, a method for preventing seal breakage in a drain trap will be described with the vapor pressure lowering agent 5 as an example.

As shown in FIG. 11, the vapor pressure lowering agent 5 is introduced such that the liquid level is a liquid level Ws equal to or higher than a seal water maintenance lower limit in a seal water portion Ts of the S-shaped drain trap T. When the liquid level Ws of the seal water liquid 10 is less than the seal water maintenance lower limit, a liquid level Ws' (an alternate long and short dash line in the drawing) of the seal water liquid 10 is located below an upper portion Tu of a curved portion Tc in the seal water portion Ts, and a gap G occurs between the upper portion Tu and the liquid level Ws'. Thus, the sealing function is not exerted.

Therefore, when the vapor pressure lowering agent 5 is introduced, the mixing ratio of the purified glycerol in the vapor pressure lowering agent 5 may be previously set such that the purified glycerol in the vapor pressure lowering agent 5 is ensured in such a remaining amount as to be equal to or higher than the seal water maintenance lower limit in the seal water portion Ts of the drain trap T. By so setting, even when a vaporization component such as water in the vapor pressure lowering agent 5 introduced to the seal water portion Ts of the drain trap T vaporizes, at least the purified glycerol remains at the seal water maintenance lower limit or higher (the liquid level Ws does not become lower than the upper portion Tu of the curved portion Tc in the seal water portion Ts), and thus it is possible to prevent an offensive odor from entering the indoor side from the sewerage side and it is possible to keep the indoor environment favorable. It should be noted that although the method for preventing seal breakage in the drain trap by using the vapor pressure lowering agent 5 has been described, the same applies to the case of using an antifreezing agent. In addition, the seal water maintenance lower limit is varied depending on the shape or the size (volume) of the drain trap, and thus the amount of introduction and/or the mixing ratio of the purified glycerol in the vapor pressure lowering agent 5 may be adjusted as appropriate in accordance with these factors.

Other Embodiments

1. The present invention is usable as an antifreezing agent for plant. In this case, since the urea, the surfactant, the purified glycerol, and the water or the alkaline reducing water are included, each of the urea and the purified glycerol is dissolved well in water to reduce the freezing point of the water. In addition, due to the synergistic effect of them, it is possible to reduce the freezing point of water in a plant. Moreover, the hydrophilicity of the fat or oil or the carbide in the purified glycerol is increased by the surfactant to decrease the surface tension, thus wettability to plant is improved, the agent does not flow out and is easily caused to stay, and it is possible to continue the antifreezing effect.

2. The present invention is usable as a depletion prevention agent for plant. In this case, since the urea, the surfactant, the purified glycerol, and the water or the alkaline reducing water are included, vaporization of fed water is suppressed by using the characteristic as a vapor pressure lowering agent, and wettability with water can also be increased by combination of the surfactant and the purified glycerol, thereby exerting a water retention effect. Therefore, it is possible to prevent a plant from dying from water shortage.

3. The present invention is usable as an antifreezing agent (antifreezing solution) for road or the like. In this case, since the urea, the surfactant, the purified glycerol, and the water or the alkaline reducing water are included, each of the urea and the purified glycerol is dissolved well in water to reduce the freezing point of the water. In addition, due to the synergistic effect of them, it is possible to reduce the freezing point of water on a road. Moreover, since no chloride is contained, the agent does not cause corrosion of a metallic material. The antifreezing agent (antifreezing solution) is sprayed to a paved or unpaved road surface as well as a parking lot, the surface of a runway or an apron in an airport, and the like, to prevent freezing of these road surfaces. In addition to a paved or unpaved road surface and the like, the present invention is also usable as an antifreezing agent for soil in a playground, a farm, and the like, and as an antifreezing agent for lawn in a golf course, a park, and the like. Moreover, the present invention is usable as an agent for preventing ice-coating on a road surface, soil, or the like from ice or snow (an anti-icing and deicing agent).

4. The present invention is usable as an antifreezing agent for article. In this case, since the urea, the surfactant, the purified glycerol, and the water or the alkaline reducing water are included, each of the urea and the purified glycerol is dissolved well in water to reduce the freezing point of the water. In addition, due to the synergistic effect of them, it is possible to reduce the freezing point of water on the surface of an article. The antifreezing agent for article is sprayed to, for example, a window glass, a wall surface, and a roof in a house, a building, or the like, a traffic sign, a signboard, and the like, to prevent freezing of the surfaces of these articles. In addition, the antifreezing agent for article is sprayed to opening/closing (movable) portions such as a door and a window, non-movable portions such as a rail, and the like in a building, to prevent immobilization of these movable members which is caused due to freezing. Moreover, the antifreezing agent for article is also applicable to a glass, a mirror, and the like in an automobile, a motorbike, and the like. Furthermore, the present invention is usable as an agent for preventing ice-coating on the above various articles such as an automobile and an airplane from ice or snow (an anti-icing, deicing, and snow-removing agent). It should be noted that it is possible to make an antifreezing paint by causing the antifreezing agent for article to contain a paint.

5. The present invention is also usable as a heating medium solution (heat storage agent) for floor heating, an ice storage device, or the like. For example, when the present invention is used for floor heating, a heating medium solution stored within a heating tank is heated by a heater or the like, and heat is released while the heated heating medium solution is circulated under a floor. Since the urea, the surfactant, the purified glycerol, and the water or the alkaline reducing water are included, the specific heat is relatively good, and the fluidity is also high.

DESCRIPTION OF THE REFERENCE CHARACTERS 2 drain pipe
5 vapor pressure lowering agent
10 mixed seal water liquid
W seal water
T U-shaped drain trap
T' bell-shaped drain trap

The invention claimed is:

1. A vapor pressure lowering agent for seal water in a drain trap, comprising urea, a surfactant, purified glycerol, and water or alkaline reducing water, wherein
the purified glycerol is obtained by purifying waste glycerol containing ethanol, an oil or fat, water, and a carbide by distillation, and
the urea is contained in an amount of 10 to 15 wt %.

2. The vapor pressure lowering agent for the seal water in the drain trap according to claim 1, wherein an amount of the surfactant is 0.1 to 5 wt %, an amount of the purified glycerol is 10 to 80 wt %, and the rest of the agent is mainly the water or the alkaline reducing water.

3. The vapor pressure lowering agent for the seal water in the drain trap according to claim 1, wherein the agent includes 20 to 80 wt % of the water or the alkaline reducing water.

4. The vapor pressure lowering agent for the seal water in the drain trap according to claim 1, wherein pH of the entire agent is 9.0 to 10.0.

5. The vapor pressure lowering agent for the seal water in the drain trap according to claim 1, wherein the purified glycerol is obtained by esterifying and purifying a plant-derived edible waste oil.

6. A method for preventing seal breakage in a drain trap by using the vapor pressure lowering agent for the seal water in the drain trap according to claim 1, the method comprising:
introducing the vapor pressure lowering agent such that a liquid level is equal to or higher than a seal water maintenance lower limit in a seal water portion of the drain trap.

7. The method for preventing seal breakage in the drain trap according to claim 6, wherein a mixing ratio of the purified glycerol in the vapor pressure lowering agent is set such that even when a vaporization component in the vapor pressure lowering agent vaporizes, the purified glycerol is ensured in such a remaining amount as to be equal to or higher than the seal water maintenance lower limit in the seal water portion of the drain trap, and the vapor pressure lowering agent is introduced to the seal water portion of the drain trap.

8. An antifreezing agent for water comprising urea, a surfactant, purified glycerol, and water or alkaline reducing water, wherein
the purified glycerol is obtained by purifying waste glycerol containing ethanol, an oil or fat, water, and a carbide by distillation, and
the urea is contained in an amount of 10 to 15 wt %.

9. The antifreezing agent for water according to claim 8, wherein an amount of the surfactant is 0.1 to 5 wt %, an amount of the purified glycerol is 10 to 80 wt %, and the rest of the agent is mainly the water or the alkaline reducing water.

10. The antifreezing agent for water according to claim 8, wherein the agent includes 20 to 80 wt % of the water or the alkaline reducing water.

11. The antifreezing agent for water according to claim 8, wherein pH of the entire agent is 9.0 to 10.0.

12. The antifreezing agent for water according to claim 8, wherein the purified glycerol is obtained by esterifying and purifying a plant-derived edible waste oil.

13. A method for preventing seal breakage in a drain trap by using the antifreezing agent for water according to claim 8, the method comprising:
introducing the antifreezing agent such that a liquid level is equal to or higher than a seal water maintenance lower limit in a seal water portion of the drain trap.

14. The method for preventing seal breakage in the drain trap according to claim 13, wherein a mixing ratio of the purified glycerol in the antifreezing agent is set such that even when a vaporization component in the antifreezing agent vaporizes, the purified glycerol is ensured in such a remaining amount as to be equal to or higher than the seal water maintenance lower limit in the seal water portion of the drain trap, and the antifreezing agent is introduced to the seal water portion of the drain trap.

* * * * *